United States Patent
Leskinen et al.

(10) Patent No.: US 10,626,199 B2
(45) Date of Patent: Apr. 21, 2020

(54) PROCESS FOR PRODUCING POLYPROPYLENE

(71) Applicant: BOREALIS AG, Vienna (AT)

(72) Inventors: Pauli Leskinen, Helsinki (FI); Johanna Lilja, Porvoo (FI); Jingbo Wang, Linz (AT); Markus Gahleitner, Neuhofen/Krems (AT); Thomas Horill, Gerasdorf (AT); Peter Denifl, Helsinki (FI); Cornelia Tranninger, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/539,112

(22) PCT Filed: Dec. 21, 2015

(86) PCT No.: PCT/EP2015/080729
§ 371 (c)(1),
(2) Date: Jun. 22, 2017

(87) PCT Pub. No.: WO2016/102430
PCT Pub. Date: Jun. 30, 2016

(65) Prior Publication Data
US 2017/0362357 A1 Dec. 21, 2017

(30) Foreign Application Priority Data

Dec. 22, 2014 (EP) .................................. 14199661

(51) Int. Cl.
| | | |
|---|---|---|
| C08F 110/06 | (2006.01) | |
| C08F 2/12 | (2006.01) | |
| C08F 4/649 | (2006.01) | |
| C08F 4/654 | (2006.01) | |
| C08F 4/646 | (2006.01) | |
| C08F 2/00 | (2006.01) | |

(52) U.S. Cl.
CPC ............ C08F 110/06 (2013.01); C08F 2/001 (2013.01); C08F 4/6465 (2013.01); C08F 4/6492 (2013.01); C08F 4/6546 (2013.01); C08F 2500/04 (2013.01); C08F 2500/12 (2013.01); C08F 2500/15 (2013.01)

(58) Field of Classification Search
USPC ...................................................... 526/125.3
See application file for complete search history.

(56) References Cited

U.S. PATENT DOCUMENTS

| | | | | |
|---|---|---|---|---|
| 6,323,150 | B1* | 11/2001 | Kojoh | C08F 10/00 502/103 |
| 7,015,170 | B2 | 3/2006 | Morini et al. | |
| 2004/0014595 | A1* | 1/2004 | Morini | C08F 4/651 502/103 |
| 2011/0086970 | A1 | 4/2011 | Grein et al. | |
| 2013/0267667 | A1* | 10/2013 | Paavilainen | C08F 10/06 526/75 |
| 2014/0357816 | A1 | 12/2014 | Virkkunen et al. | |
| 2016/0272740 | A1* | 9/2016 | Wang | C08F 110/06 |

FOREIGN PATENT DOCUMENTS

| | | |
|---|---|---|
| EP | 0491566 A2 | 6/1992 |
| EP | 0591224 A1 | 4/1994 |
| EP | 586390 A1 | 5/1997 |
| EP | 887379 A1 | 12/1998 |
| EP | 2452957 A1 | 5/2012 |
| EP | 2610273 A1 | 3/2013 |
| EP | 2610271 A1 | 7/2013 |
| EP | 2610272 A1 | 7/2013 |
| WO | 92/09653 A | 11/1991 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2012/007430 A1 | 1/2012 |
| WO | 2014/206950 A1 | 12/2014 |
| WO | WO 2015/075088 A1 * | 5/2015 |

OTHER PUBLICATIONS

Busico et al., "Microsructure of polypropylene", Prog. Polym. Sci. 26 (2001) 443-533.
Busico et al., "Full Assignment of the 13C NMR Spectra of Regioregular Polypropylenes: Methyl and Methylene Region", Macromoleucles 30 (1997) 6251-6263.
Resconi et al., "Selectivity in Propene Polymerization with Metallocene Catalysts", Chem. Rev. 2000, 100, 1253-1345.
Wang et al., "Structural Analysis of Ethylene/Propylene Copolymers Synthesized with a Constrained Geometry Catalyst", Macromolecules 33 (2000), 1157-1162.

(Continued)

Primary Examiner — Fred M Teskin
(74) Attorney, Agent, or Firm — Insigne LLP

(57) ABSTRACT

Propylene is polymerised in the presence of a polymerisation catalyst comprising a solid catalyst component, an organoaluminium compound and an external electron donor, the process comprising the steps of (i) contacting propylene and hydrogen with the polymerisation catalyst in polymerisation conditions in a polymerisation reactor to produce a polymer of propylene; (ii) recovering the polymer of propylene from the polymerisation reactor; wherein the polymer of propylene has MFR of from more than 100 to 10000 g/10 min. The solid catalyst component comprises titanium, magnesium, halogen and an internal electron donor, characterised in that the internal electron donor is a compound according to formula (I):

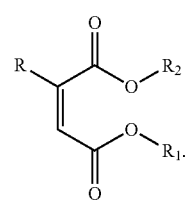

(I)

15 Claims, No Drawings

(56) References Cited

OTHER PUBLICATIONS

Cheng, "13C NMR Analysis of Ethylene-Propylene Rubbers", Macromolecules 17 (1984), 1950.
Klimke et al., "Optimisation and Application of Polyolefin Branch Quantification by Melt-State 13C NMR Spectroscopy", Macromol. Chem. Phys. 2006;207:382-395.
Parkinson et al, "Effect of Branch Length on 13C NMR Relaxation Properties in Molten Poly[ethylene-co-(a-olefin)] Model Systems", Macromol. Chem. Phys. 2007;208:2128-2133.
Pollard et al., Observation of Chain Branching in Polyethylene in the Solid State and Melt Macromolecules 2004;37:813.
Filip et al., "Heteronuclear decoupling under fast MAS by a rotor-synchronized Hahn-echo pulse train", Mag. Resn. 2005, 176, 239-243.
Griffin et al., "Low-load rotor-synchronised Hahn-echo pulse train (RS-HEPT) 1H decoupling in solid-state NMR: factors affecting MAS spin-echo dephasing times", Mag. Res. in Chem. 2007 45, S1, S198-S208.
Castignolles et al., "Detectoin and quantification of branching in polyacrylatees by size-exclusion chromatography (SEC) and melt-state 13C NMR spectroscopy", Polymer 50 (2009) 2373-2383.
Zhou et al., "A new decoupling method for accurate quantification of polyethylene copolymer compoisition and triad sequence distribution with 13C NMR", J. Mag. Reson. 187 (2007) 225.
Busico et al., "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-34.
International Search Report of International Application PCT/EP2015/080729 dated May 3, 2016.

\* cited by examiner

PROCESS FOR PRODUCING POLYPROPYLENE

FIELD OF THE INVENTION

The present invention is directed to a process of producing polypropylene. Especially, the present invention is directed to the process of producing polypropylene having a high melt flow rate. More specifically, the polypropylene having the high melt flow rate is produced in the presence of a specific polymerisation catalyst and is recovered from the polymerisation reactor.

Problem to be Solved

Polypropylene with a very high melt flow rate is typically produced so that a lower melt flow rate polymer is produced in a polymerisation process and the resulting polymer is extruded in the presence of a free-radical generator, such as peroxide, for producing the high melt flow rate polypropylene. Such methods have the drawback that the degradation products of the free-radical generator and polymer may be left in the polymer. This could lead to inferior organoleptic properties, such as odour or taste.

Alternatively, the high melt flow rate polypropylene can be produced directly in the reactor in the presence of a high content of hydrogen. In such methods the transition times can become excessive as increasing and reducing the hydrogen content within the reactor can be time-consuming. In such methods the amount of transition material can increase, leading to economical loss. In case of liquid-phase polymerisation processes, the maximum amount of hydrogen which can be used in the polymerisation is further limited by the solubility in the reaction medium, as above said solubility limit bubbles will form in the reactor, potentially damaging the equipment and resulting in uneven reaction conditions.

EP-A-2452957 discloses a process where polypropylene having a high melt flow rate was produced in the presence of a catalyst system having diethylaminotriethoxysilane as an external donor. The solid component of the catalyst used in the examples had been produced according to WO-A-92/09653.

EP-A-2610273 discloses a process where polypropylene was produced in the presence of a catalyst having an internal donor selected from specific 1,3-diethers. The examples disclosed that polymers having a melt flow rate of from 23 to 61 g/10 min were produced by using dicyclopentyldimethoxysilane as the external donor.

In spite of the known processes for propylene polymerisation there still remains a need for an economical process for producing reactor-made polypropylene having a high melt flow rate.

SUMMARY OF THE INVENTION

A process for polymerising propylene in the presence of a polymerisation catalyst comprising a solid catalyst component, an organoaluminium compound and an external electron donor, the process comprising the steps of (i) contacting propylene and hydrogen with the polymerisation catalyst in polymerisation conditions in a polymerisation reactor to produce a polymer of propylene; (ii) recovering the polymer of propylene from the polymerisation reactor; wherein the polymer of propylene has $MFR_2$ of from more than 100 to 10000 g/10 min; and the solid catalyst component comprises titanium, magnesium, halogen and an internal electron donor, characterised in that the internal electron donor is a compound according to formula (I):

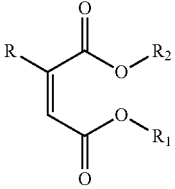

with $R_1$ and $R_2$ being the same or different and being a linear or branched $C_1$-$C_{12}$-alkyl group, and with R being H or a linear, branched or cyclic $C_1$ to $C_{12}$-alkyl, and preferably R is not H; and the external electron donor is a silane compound having the formula $Si(OR^{11})_nR^{10}_{4-n}$, wherein each $R^{11}$ is independently a linear or branched $C_1$-$C_4$ alkyl, preferably methyl or ethyl; and each $R^{10}$ is independently a linear or branched alkyl group having from 1 to 24 carbon atoms and optionally containing an atom of group 15 of periodic table of elements or comprises a cyclic group having from 6 to 12 carbon atoms.

DETAILED DESCRIPTION

The present invention aims at a process for producing propylene polymers having a high melt flow rate ($MFR_2$ as determined in accordance with ISO1133 at 230° C. and a load of 2.16 kg). The polymers have an $MFR_2$ of from 100 to 10000 g/10 min, preferably from 100 to 7000 g/10 min, more preferably from 100 to 5000 g/10 min, like from 100 to 2000 g/10 min.

Said propylene polymers preferably also have a relatively low molecular weight. The weight average molecular weight (Mw) as determined by size exclusion chromatography (SEC) will preferably be in the range of 10 to 250 kg/mol, more preferably in the range of 20 to 200 kg/mol, like in the range of 25 to 180 kg/mol. As said polymers are produced directly in a polymerisation process and the resulting polymer is not further extruded in the presence of a free-radical generator, such as peroxide, the molecular weight distribution parameter Mw/Mn (with Mn being the number average molecular weight) will preferably be in the range of 4.0 to 10.0, more preferably in the range of 4.5 to 9.5.

Said propylene polymers are propylene homopolymers or random copolymers of propylene with ethylene and/or linear 1-alkenes having 4 to 10 carbon atoms as comonomer.

In case the propylene polymer is a propylene homopolymer it is featured by a high isotacticity expressed as pentad regularity [mmmm] determined by $^{13}C$ NMR spectroscopy of more than 85.0%, preferably more than 88.0%, more preferably more than 90.0%. Such propylene homopolymers will further be featured by a high melting point as determined by differential scanning calorimetry (DSC), said melting point being in the range of 160 to 170° C., preferably in the range of 162 to 168° C. Such propylene homopolymers will preferably contain less than 0.6 wt % of comonomer selected from the group of ethylene and/or linear 1-alkenes having 4 to 10 carbon atoms. More preferably, such propylene homopolymers will contain less than 0.3 wt % of comonomer, and most preferably they will be free of comonomer. Such propylene homopolymers will have only one glass transition as determined by dynamic-mechanical thermal analysis (DMTA), being in the range of −5 to +5° C.

In case the propylene polymer is a random copolymer of propylene with ethylene and/or linear 1-alkenes having 4 to 10 carbon atoms as comonomer the content of said comonomers will be in the range of 0.6 to 10.0 wt %, preferably in the range of 0.8 to 8.0 wt %, more preferably in the range of 1.0 to 6.5 wt %. Such random propylene copolymers will further be featured by a reduced melting point as determined by DSC, said melting point being in the range of 135 to 160° C., preferably in the range of 140 to 158° C. The propylene random copolymer according to this invention is preferably monophasic. Accordingly it is preferred that said propylene random copolymer does not contain elastomeric (co)polymers forming inclusions as a second phase for improving mechanical properties. The presence of second phases or the so called inclusions are for instance visible by high resolution microscopy, like electron microscopy or atomic force microscopy, or by DMTA where the presence of a multiphase structure can be identified by the existence of at least two distinct glass transition temperatures. It is consequently preferred that said propylene random copolymer has no glass transition temperature below −30.0, preferably below −25.0° C., more preferably below −20.0° C., but one glass transition temperature in the range of −12.0 to +4.0° C., more preferably in the range of −10.0 to +3.0° C.

In one embodiment the present invention further aims at a process for producing copolymers of propylene with ethylene and/or linear 1-alkenes having 4 to 10 carbon atoms, said process involving at least two steps. In the first step (a) a propylene homopolymer or a propylene random copolymer as defined above having a high melt flow rate (MFR$_2$) of from 100 to 10000 g/10 min is produced in one or more reactors, while in the second step (b) a predominantly non-crystalline copolymer of propylene with ethylene and/or linear 1-alkenes having 4 to 10 carbon atoms as comonomer is produced.

The predominantly non-crystalline copolymer of propylene with ethylene and/or linear 1-alkenes having 4 to 10 carbon atoms as comonomer produced in step (b) is commonly also called elastomeric polymer component or, in case it contains only ethylene and propylene, ethylene propylene rubber. Together with the propylene homopolymer or random propylene copolymer produced in step (a) it will form a heterophasic polypropylene composition, i.e. a system consisting of a polypropylene matrix in which an elastomeric phase is dispersed.

In said predominantly non-crystalline copolymer of propylene with ethylene and/or linear 1-alkenes having 4 to 10 carbon atoms as comonomer produced in step (b) the comonomer content will preferably be in the range of 25 to 65% by mole, more preferably in the range of 30 to 60% by mole. In this embodiment the non-crystalline copolymer of propylene with ethylene and/or linear 1-alkenes having 4 to 10 carbon atoms is present in the total amount of the propylene polymer of from 5 to 50% by weight, preferably from 5 to 30% by weight.

A heterophasic polypropylene composition comprising a propylene homopolymer or random propylene copolymer produced in step (a) and a predominantly non-crystalline copolymer of propylene produced in step (b) is further characterized by the presence of at least two glass transition points as determined by DMTA. Preferably, the glass transition point related to the propylene homopolymer or random propylene copolymer produced in step (a) will be in the range of −12.0 to +5.0° C., while the glass transition point related to the predominantly non-crystalline copolymer of propylene produced in step (b) will be in the range below −30.0°, preferably in the range of −65.0 to −35.0° C.

Catalyst

According to the present invention propylene is polymerised in the presence of a catalyst comprising a solid component, an organoaluminium compound and an external electron donor. The solid catalyst component comprises an internal electron donor which is a compound having the structure according to formula (I) below:

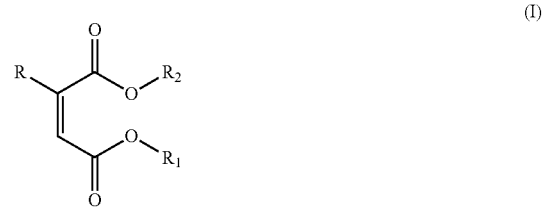

(I)

wherein R$_1$ and R$_2$ are the same or different being a linear or branched C$_1$-C$_{12}$-alkyl group and R is hydrogen or a linear, branched or cyclic C$_1$ to C$_{12}$-alkyl.

Preferably R$_1$ and R$_2$ are a linear or branched C$_1$-C$_8$-alkyl group, more preferably a linear or branched C$_1$-C$_4$-alkyl group and most preferably ethyl, whereby R$_1$ and R$_2$ are preferably the same.

R is preferably not hydrogen. Especially preferably R is a linear or branched C$_1$ to C$_3$-alkyl and in particular R is methyl.

The catalyst used in the present invention is solid Ziegler-Natta catalyst, which comprises compounds of a transition metal of Group 4 to 6 of IUPAC, like titanium, a Group 2 metal compound, like magnesium and an internal donor (ID) being a compound according to formula (I). Thus, the catalyst is free of undesired phthalic compounds. Further, the solid catalyst is preferably free of any external support material, like silica or MgCl$_2$, but the catalyst is self-supported. The solid catalyst in particulate form is suitably obtainable by the following general procedure:

a) providing a solution of a$_1$) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or a$_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or a$_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or a$_4$) Group 2 metal alkoxy compound of formula M(OR$_3$)$_n$(OR$_4$)$_m$X$_{2-n-m}$ or mixture of Group 2 alkoxides M(OR$_3$)$_{n'}$X$_{2-n'}$ and M(OR$_4$)$_m$X$_{2-m'}$, where M is Group 2 metal, X is halogen, R$_3$ and R$_4$ are different alkyl groups of C$_2$ to C$_{16}$ carbon atoms, and 0≤n<2, 0≤m<2 and n+m+(2−n−m)=2, provided that both n and m≠0, 0<n'≤2 and 0<m'≤2; and b) adding said solution from step a) to at least one compound of a transition metal of Group 4 to 6 and c) obtaining the solid catalyst component particles, and adding the internal electron donor compound according to formula (I) at any step prior to step c).

The internal donor according to formula (I) or precursor thereof is thus added preferably to the solution of step a) or to the transition metal compound before adding the solution of step a).

According to the procedure above the solid catalyst can be obtained via precipitation method or via emulsion—solidification method depending on the physical conditions, especially temperature used in steps b) and c). Emulsion is also called liquid/liquid two-phase system. In both methods (precipitation or emulsion-solidification) the catalyst chemistry is the same.

In precipitation method combination of the solution of step a) with at least one transition metal compound in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

Illustrative monohydric alcohols (B) are of formula $R^{14}OH$, with $R^{14}$ being straight-chain or branched $C_2$-$C_{16}$ alkyl residue, preferably $C_4$ to $C_{10}$, more preferably $C_6$ to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particularly preferred.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferably it is polydecene.

The solid particulate product is obtained by precipitation or emulsion—solidification method may be washed at least once, preferably at least twice, most preferably at least three times with an aromatic and/or aliphatic hydrocarbons, preferably with toluene, heptane or pentane and/or with $TiCl_4$. Washing solutions can also contain donors and/or compounds of Group 13, like trialkyl aluminium, halogenated alkyl aluminium compounds or alkoxy aluminium compounds. Aluminium compounds can also be added during the catalyst synthesis.

The catalyst can further be dried, as by evaporation or flushing with nitrogen or it can be slurried to an oily liquid without any drying step.

The finally obtained Ziegler-Natta catalyst is desirably in the form of particles having generally an average particle size range of 5 to 200 μm, preferably 10 to 100 μm. Particles are compact with low porosity and have surface area below 20 m²/g, more preferably below 10 m²/g. Typically the amount of Ti is 1-6 wt-%, Mg 10 to 20 wt-% and donor 10 to 40 wt-% of the catalyst composition.

Detailed description of preparation of catalysts is disclosed in WO-A-2012/007430, EP-A-2610271, EP-A-261027 and EP-A-2610272.

The solid catalyst component is contacted with an organoaluminium compound and an external electron donor before or when using it in polymerisation.

The organoaluminium compound is preferably an aluminium alkyl or aluminium alkyl halide compound. Accordingly the organoaluminium compound may be a trialkylaluminium, like triethylaluminium (TEAL), tri-isobutylaluminium, trimethylaluminium, tri-n-hexylaluminium or tri-n-octylaluminium. It may further be alkylaluminium chloride, such as dialkyl aluminium chloride or alkyl aluminium dichloride. Furthermore, the organoaluminium compound may be a mixture of two or more above-mentioned compounds. Especially preferably the organoaluminium compound is triethylaluminium (TEAL).

As further component in the instant polymerisation process the external donor (ED). The external donor is a silane compound having the formula $Si(OR^{11})_nR^{10}{}_{4-n}$, wherein each $R^{11}$ is independently a linear or branched $C_1$-$C_4$ alkyl, preferably methyl or ethyl; and each $R^{10}$ is independently a linear or branched alkyl group having from 1 to 24 and optionally containing an atom of group 15 of periodic table of elements or comprises a cyclic group having from 6 to 12 carbon atoms. Preferably each $R^{10}$ is independently cyclohexyl, phenyl, methyl, ethyl, propyl, isopropyl, tert-butyl or iso-butyl and a group having the formula $NR^{12}R^{13}$, wherein $R^{12}$ and $R^{13}$ are each independently a $C_1$-$C_{12}$-hydrocarbyl group, preferably methyl, ethyl, propyl, butyl, octyl, decanyl, iso-propyl, iso-butyl, iso-pentyl, tert-butyl, tert-amyl, cyclohexyl, methylcyclopentyl or cycloheptyl group. Especially preferably the electron donor is selected from the group consisting of dicyclopentyldimethoxysilane, cyclohexylmethyldimethoxysilane, diphenyldimethoxysilane, di-tert-butyldimethoxysilane, and (diethylamino)triethoxysilane. Especially good results have been obtained with (diethylamino)triethoxysilane.

The molar ratio between the organoaluminium compound and the external donor [Al/ED] is within the range of from 6 to 35, preferably from 6 to 30.

Polymerisation

The polymerisation process is conducted by contacting the above-described polymerisation catalyst with propylene and hydrogen as well as optional comonomers.

The polymerisation may be conducted according to any method known in the art as slurry or gas phase polymerisation. Furthermore, the polymerisation may be conducted in multiple cascaded reactors, where, for instance, in one or more reactors is produced a semicrystalline matrix and in one or more reactors an elastomeric rubber phase dispersed in the matrix.

It is preferred that the polymerisation process comprises at least one polymerisation step where propylene is polymerised in slurry. Especially preferably the slurry polymerisation step is conducted in a loop reactor. While there may be other steps where the resulting polymer also has the $MFR_2$ in the desired range of from 100 to 10000 g/mol it is then preferred that the polymer of propylene produced in the slurry polymerisation step, more preferably in the loop reactor, has the $MFR_2$ in the desired range of from 100 to 10000 g/mol.

When the polymerisation is conducted in slurry, the temperature is typically from 50 to 100° C., preferably from 60 to 90° C. The pressure is typically from 1 to 100 bar, preferably from 10 to 80 bar and more preferably from 20 to 70 bar. The polymerisation may be conducted in any reactor known in the art, for instance, loop reactor and continuous stirred tank reactor.

In slurry polymerisation the polymer particles, including the active catalyst, are suspended in a fluid phase. The fluid phase may be a liquid phase or a so called supercritical phase where the temperature of the fluid is greater than the critical temperature thereof and the pressure of the fluid is greater than the critical pressure thereof. Preferably the fluid phase is a liquid phase.

The fluid phase comprises propylene monomer, eventual comonomer(s), hydrogen and eventual inert component(s). Preferably an inert component is not present or the amount of inert components is small, such as less than 40% by mole, based on the total amount of the fluid, preferably no more than 20% by mole or even no more than 10% by mole, based on the total amount of the fluid. It is especially preferred that the feed of inert components is at minimum, such as what is needed to introduce the catalyst into the reactor and what comes in as impurities together with propylene and eventual comonomer.

In slurry polymerisation the average residence time of the polymer in the reactor is usually less than two hours, such as from 20 to 90 minutes, preferably from 30 to 70 minutes. The melt flow rate is controlled by adding hydrogen and typically the molar ratio of hydrogen to propylene in the fluid phase is from 3 to 40 mol/kmol, preferably from 5 to 30 mol/kmol. Especially preferably when the polymerisation is conducted in the loop reactor the molar ratio of hydrogen to propylene in the fluid phase is from 4 to 25 mol/kmol, and in particular from 4 to 10 mol/kmol. As the person skilled in the art knows, greater hydrogen to propylene ratio results in a greater melt flow rate of the polymer.

Comonomer, such as ethylene, may be used in the polymerisation, if needed. Suitable comonomers are ethylene and alpha-olefins having from four to eight carbon atoms. Most preferred comonomers are ethylene, 1-butene and 1-hexene. The comonomer, if used, is added in such amount that desired comonomer content in the polymer is obtained. Certain comonomers may also have an effect on the molecular weight, and thus the melt flow rate, of the polymer. For instance, when using ethylene as the comonomer it may be necessary to increase the hydrogen to propylene ratio for reaching the desired melt flow rate.

Preferably, a comonomer is not present whereby the resulting polymer of propylene is a homopolymer of propylene.

The solid catalyst component, the organoaluminium compound and the external electron donor may be contacted with each other before their entry into the polymerisation reactor or they may be introduced as separate components. It is preferred to contact the catalyst components before introducing them into the reactor. One suitable method of contacting the catalyst components is first contacting the organoaluminium compound and the external electron donor, for instance at a temperature within the range of from 0 to 50° C. and thereafter contacting the mixture with the solid catalyst component at a temperature within the range of from 0 to 50° C. Another method includes contacting all three components simultaneously at a temperature within the range of from 0 to 50° C. The time needed for precontacting is typically from about 30 seconds to about one hour.

After the precontacting the catalyst components may be introduced to the polymerisation reactor. It is, however, possible and preferred to introduce the precontacted catalyst components into a prepolymerisation stage where the catalyst is contacted with propylene at a temperature of from about −10 to 50° C. to polymerise a small amount of propylene onto the catalyst. Typically the amount of propylene polymerised in the prepolymerisation stage is from 50 to 1000 grams of polymer per one gram of catalyst.

It is also possible to introduce the catalyst components separately into the prepolymerisation stage as described above, without precontacting.

From the prepolymerisation stage the prepolymerised catalyst is passed to the polymerisation reactor where the polymerisation is conducted as described above.

When the polymerisation is conducted in gas phase, the temperature is typically from 50 to 100° C., preferably from 60 to 90° C. The pressure is typically from 1 to 60 bar, preferably from 3 to 50 bar and more preferably from 5 to 30 bar. The polymerisation may be conducted in any reactor known in the art, for instance, fluidised bed reactor, stirred bed reactor, settled bed reactor or fast fluidised bed reactor. If the polymerisation is conducted in gas phase it is then preferred to conduct the process in a fluidised bed reactor.

In gas phase polymerisation the average residence time of the polymer in the reactor is usually from one to five hours, preferably from 1.5 to 4 hours. The melt flow rate is controlled by adding hydrogen and typically the molar ratio of hydrogen to propylene is from 30 to 400 mol/kmol, preferably from 50 to 300 mol/kmol.

Comonomer may be used in the polymerisation, as described above for slurry polymerisation. Suitable comonomers are ethylene and alpha-olefins having from four to eight carbon atoms. Most preferred comonomers are ethylene, 1-butene and 1-hexene. The comonomer, if used, is added in such amount that desired comonomer content in the polymer is obtained. Certain comonomers may also have an effect on the molecular weight, and thus the melt flow rate, of the polymer. For instance, when using ethylene as the comonomer it may be necessary to increase the hydrogen to propylene ratio for reaching the desired melt flow rate.

Preferably, a comonomer is not present whereby the polymer of propylene is a homopolymer of propylene.

Before introducing the polymerisation catalyst into the polymerisation reactor they may be precontacted as described above. Furthermore, the catalyst may be prepolymerised, as described above.

In addition to the polymerisation step for producing the polymer of propylene having the melt flow rate of from 100 to 10000 g/10 min the polymerisation process may comprise additional steps for producing other types of polymers. These may be further slurry or gas phase polymerisation steps. The further polymerisation steps may precede or succeed the polymerisation step where the propylene polymer having the melt flow rate of from 100 to 10000 g/10 min is produced. In an especially preferred embodiment the additional step or additional steps are conducted for producing elastomeric polymer, such as elastomeric copolymer of propylene and ethylene. In such a case the additional polymerisation step or additional polymerisation steps succeed the polymerisation step for producing the polymer of propylene having the melt flow rate of from 100 to 10000 g/10 min.

In each polymerisation reactor the composition of the reactor contents can be analysed according to the methods known in the art. Such methods usually include steps of taking gas or liquid samples from the reactor contents and passing the sample to an analyser, such as one or more on-line gas chromatographs or infrared analysis equipment, respectively. Suitable equipment is available, among others, from Siemens, Emerson, AMA Instruments and ABB.

A preferred multistage process is a "loop-gas phase"-process, such as developed by Borealis A/S, Denmark (known as BORSTAR® technology) described e.g. in patent literature, such as in EP-A-887379, WO-A-92/12182 WO-A-2004/000899, WO-A-2004/111095, WO-A-99/24478, WO-A-99/24479 or in WO-A-00/68315.

A further suitable slurry-gas phase process is the Spheripol® process of Basell as described for example in chapter 6 of Nello Pasquini (Ed.), Polypropylene Handbook, 2nd ed., Hanser Publishers, Munich (2005).

Benefits of the Invention

The present invention allows producing propylene polymers having high melt flow rate in a simple and economical process. Especially the polymer can be produced at a lower amount of hydrogen in the reactor leading to shorter transition times. Further, lower hydrogen concentration also reduces the risk of bubble formation in the reactor and thus also the risk of operational disturbances.

Description of Methods

Melt Flow Rate

Melt flow rate (MFR) was determined according to ISO 1133 at 230° C. The load under which the measurement is conducted is given as a subscript. Thus, the MFR under the load of 2.16 kg is denoted as $MFR_2$.

Quantification of Microstructure by NMR Spectroscopy

Quantitative nuclear-magnetic resonance (NMR) spectroscopy was used to quantify the isotacticity, tacticity distribution and content of regio-defects of the polymers.

Quantitative 13C{1H} NMR spectra recorded in the solution-state using a Bruker Advance III 400 NMR spectrometer operating at 400.15 and 100.62 MHz for 1H and 13C respectively. All spectra were recorded using a 13C optimised 10 mm selective excitation probehead at 125° C. using nitrogen gas for all pneumatics. Approximately 200 mg of material was dissolved in 1,2-tetrachloroethane-d2 (TCE-d2). This setup was chosen primarily for the high resolution needed for tacticity distribution quantification (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251). Standard single-pulse excitation was employed utilising the NOE and bi-level WALTZ16 decoupling scheme{zhou07,busico07}. A total of 8192 (8 k) transients were acquired per spectra The tacticity distribution was quantified through integration of the methyl region between 23.6 and 19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251). Characteristic signals corresponding to the presence of regio defects (Resconi, L., Cavallo, L., Fait, A., Piemontesi, F., Chem. Rev. 2000, 100, 1253) and ethylene copolymerisation (Wang, W.-J., Zhu, S., Macromolecules 33 (2000), 1157; Cheng, H. N., Macromolecules 17 (1984), 1950) were not observed.

The pentad tacticity distribution was determined through direct separate integration of each methyl signal from a given steric pentad followed by normalisation to the sum of methyl signals from all steric pentads. The relative content of a specific steric pentad was reported as the mole fraction or percentage of a given steric pentad xxxx with respect to all steric pentads:

[xxxx]=xxxx/(mmmm+mmmr+rmmr+mmrr+xmrx+mrmr+rrrr+mrrr+mrrm)

where xmrx represents the combined integral of both mmrm and rmrr as signal from these steric pentads are not commonly resolved. The pentad isotacticity was thus given by:

[mmmm]=mmmm/(mmmm+mmmr+rmmr+mmrr+xmrx+mrmr+rrrr+mrrr+mrrm)

The triad tacticity distribution was indirectly determined from the pentad tacticity distribution using the known pentad-triad necessary relationships:

[mm]=[mmmm]+[mmmr]+[rmmr]
[mr]=[mmrr]+[xmrx]+[mrmr]
[rr]=[rrrr]+[mrrr]+[mrrm]

The average length of stereo sequences consisting of two or more monomer unites with like tacticity, i.e. the meso sequence length determined from the triad tacticity distribution (MSL2), was calculated using the relative amounts of the mm and mr steric triads:

MSL2=2+2 [mm]/[mr]

The average length of stereo sequences consisting of four or more monomer unites with like tacticity, i.e. the meso sequence length determined from the pentad tacticity distribution (MSL4), was calculated using the relative amounts of the mmmm and mmmr steric pentads:

MSL4=4+2 [mmmm]/[mmmr]

Klimke, K., Parkinson, M., Piel, C., Kaminsky, W., Spiess, H. W., Wilhelm, M., Macromol. Chem. Phys. 2006; 207:382.

Parkinson, M., Klimke, K., Spiess, H. W., Wilhelm, M., Macromol. Chem. Phys. 2007; 208:2128.

Pollard, M., Klimke, K., Graf, R., Spiess, H. W., Wilhelm, M., Sperber, O., Piel, C., Kaminsky, W., Macromolecules 2004; 37:813.

Filip, X., Tripon, C., Filip, C., J. Mag. Resn. 2005, 176, 239

Griffin, J. M., Tripon, C., Samoson, A., Filip, C., and Brown, S. P., Mag. Res. in Chem. 2007 45, S1, S198

Castignolles, P., Graf, R., Parkinson, M., Wilhelm, M., Gaborieau, M., Polymer 50 (2009) 2373

Busico, V., Cipullo, R., Prog. Polym. Sci. 26 (2001) 443

Busico, V., Cipullo, R., Monaco, G., Vacatello, M., Segre, A. L., Macromoleucles 30 (1997) 6251

Zhou, Z., Kuemmerle, R., Qiu, X., Redwine, D., Cong, R., Taha, A., Baugh, D. Winniford, B., J. Mag. Reson. 187 (2007) 225

Busico, V., Carbonniere, P., Cipullo, R., Pellecchia, R., Severn, J., Talarico, G., Macromol. Rapid Commun. 2007, 28, 1128

Resconi, L., Cavallo, L., Fait, A., Piemontesi, F., Chem. Rev. 2000, 100, 1253

DSC Analysis, Melting Temperature (Tm) and Melting Enthalpy (Hm)

This was measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Melting temperature (Tm) and melting enthalpy (Hm) are determined from the second heating step.

Glass Transition Temperature(s) Tg

Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Size Exclusion Chromatography (SEC)

The number average molecular weight (Mn), weight average molecular weight (Mw) and polydispersity (Mw/Mn) are determined by size exclusion chromatography (SEC) using Waters Alliance GPCV 2000 instrument with online viscometer. The oven temperature is 140° C. Trichlorobenzene is used as a solvent (ISO 16014).

Flexural Modulus

The flexural modulus was determined in 3-point-bending at 23° C. according to ISO 178 on 80×10×4 mm$^3$ test bars injection moulded in line with EN ISO 1873-2.

EXAMPLES

Example 1

Catalyst Preparation
Preparation of a Mg Alkoxy Compound

Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes.

After cooling to room temperature 2.3 kg of the donor bis(2-ethylhexyl)citraconate was added to the Mg-alkoxide solution keeping temperature below 25° C. Mixing was continued for 15 minutes under stirring (70 rpm)

Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away.

Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

Polymerisation

A continuously operating stirred reactor having a volume of 38 dm$^3$ was operated at a temperature 25° C. and a pressure of 45 bar. Into the reactor were introduced the solid catalyst component produced according to the description of Catalyst Preparation above together with triethylaluminium and diethylaminotriethoxysilane so that the molar ratio of TEAL/Ti was 180 mol/mol and the ratio TEAL/ED was 26 mol/mol. Additionally, propylene and hydrogen were added so that the molar ratio of hydrogen to propylene ($H_2/C_3$) was 1.3 mol/kmol.

The slurry from the stirred reactor was continuously passed into a loop reactor having the volume of 150 dm$^3$ and which was operated at 70° C. temperature and 45 bar pressure. Further, propylene and hydrogen were introduced so that the molar ratio $H_2/C_3$ was 24 mol/kmol. A slurry stream was withdrawn from the loop reactor and the polymer was recovered and analysed. The melt flow rate of the polymer was 4400 g/10 min.

Examples 2 to 3

The procedure of Example 1 was repeated except that the conditions were as shown in Table 1.

TABLE 1

Production parameters and polymer properties of PP homopolymers produced by using diethylaminotriethoxysilane as the external donor

| Example | Unit | E1 | E2 | E3 | CE1 |
|---|---|---|---|---|---|
| TEAL/Ti | mol/mol | 170 | 180 | 160 | 150 |
| TEAL/Don | mol/mol | 26 | 26 | 26 | 10 |
| Prepol | | | | | |
| H2/C3 | mol/kmol | 1.3 | 1.3 | 1.3 | 1.0 |
| Loop | | | | | |
| H2/C3 | mol/kmol | 24 | 15 | 5 | 25 |
| $MFR_2$ | g/10 min | 4400 | 3200 | 400 | 250 |
| Mw | kg/mol | 46.1 | 52.5 | 85.9 | 108.0 |
| Mw/Mn | — | 5.7 | 5.7 | 5.8 | 9.1 |
| XCS | wt % | 6.6 | 6.5 | 5 | 3.5 |
| Tm | ° C. | 158 | 160 | 162 | 164 |
| Hm | J/g | 100 | 104 | 104 | 100 |
| Tg | ° C. | 2.0 | 2.5 | 2.0 | 2.5 |
| mmmm | % | ND | ND | 95.2 | 94.0 |
| Flexural Modulus | MPa | ND | ND | 1540 | 1500 |

ND: Not determined

Comparative Example 1

Comparative Catalyst Preparation

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried.

Catalyst and its preparation concept is described in general e.g. in patent publications EP-A-491566, EP-A-591224 and EP-A-586390.

Polymerisation

The procedure of Example 1 was repeated except that the solid catalyst component prepared according to Comparative Catalyst Preparation above was used and the conditions were as shown in Table 1. The melt flow rate of the polymer was 250 g/10 min.

TABLE 2

Production parameters and polymer properties of PP homopolymers produced by using cyclohexyl-methyldimethoxysilane as the external donor

| Example | unit | E4 | E5 | E6 | CE2 |
|---|---|---|---|---|---|
| TEAL/Ti | mol/mol | 170 | 170 | 170 | 170 |
| TEAL/Don | mol/mol | 10 | 10 | 10 | 10 |
| Loop | | | | | |
| H2/C3 | mol/kmol | 5.0 | 6.5 | 10 | 11 |
| $MFR_2$ | g/10 min | 150 | 200 | 400 | 100 |
| Mw | kg/mol | 114.5 | 108.0 | 97.2 | 133.5 |
| Mw/Mn | — | 5.1 | 6.8 | 4.9 | 7.6 |
| XCS | wt % | 4.4 | 4.2 | 4.8 | 3.5 |
| Tm | ° C. | 163 | 162 | 163 | 162 |
| Hm | J/g | 100 | 101 | 98 | 98 |
| Tg | ° C. | 2.5 | 2.0 | 1.5 | 2.5 |
| mmmm | % | 92.9 | 93.2 | 93.4 | 93.5 |
| Flexural Modulus | MPa | 1600 | 1660 | ND | 1470 |

ND: Not determined

Examples 4 to 6

The procedure of Example 1 was repeated except that cyclohexylmethyldimethoxysilane was used as the external donor instead of diethylaminotriethoxysilane. Further, the TEAL/Donor ratio was 10 mol/mol. The data is shown in table 2 above.

Comparative Example 2

The procedure of Example 6 was repeated except that the solid catalyst component was produced according to the procedure described Comparative Catalyst Preparation in Comparative Example 1. The data is shown in table 2 above.

It is thus seen that according to the present process a lower hydrogen to propylene ratio is needed to reach a given melt flow rate of the propylene polymer than in the prior art processes. By using the present process the $MFR_2$ of the resulting propylene polymer can be at least 3 times greater than the $MFR_2$ of the polymer produced by a prior art process when the polymerisation is otherwise conducted at the same conditions (at the same $H_2/C_3$-ratio).

Example 7

The procedure of Example 1 was repeated except that the conditions were as shown in Table 3. The solid catalyst component was subjected to prepolymerisation with vinyl-cyclohexane as follows.

Triethylaluminium (TEAL), cyclohexylmethyldimethoxysilane as donor (Do), solid catalyst component as produced according to Catalyst preparation of Example 1 above and vinylcyclohexane (VCH) were added into oil, e.g. Technol 68, provided in amounts so that Al/Ti was 3-4 mol/mol, Al/Do was 4 mol/mol, and weight ratio of VCH/solid catalyst was 1/1. The mixture was heated to 60-65° C. and allowed to react until the content of the unreacted vinylcyclohexane in the reaction mixture was less than 1000 ppm. Catalyst concentration in the final oil-catalyst slurry was 10-20 wt-%.

In the subsequent polymerisation the polymer slurry from the loop reactor was passed to a first gas phase reactor where additional homopolymer of propylene was produced. The polymer was withdrawn from the first gas phase reactor and passed to a second gas phase reactor where copolymerisation of ethylene and propylene was conducted so that an elastomeric copolymer component was formed. The polymerisation conditions and the polymer properties are shown in Table 3.

Comparative Example 3

The procedure of Example 7 was repeated except that dicyclopentyldimethoxysilane (DCPDMS) was used as the external donor. The polymerisation conditions are shown in Table 3.

Comparative Example 4

The procedure of Comparative Example 3 was repeated except that the solid catalyst component was produced according to the comparative catalyst preparation of Comparative Example 1. The solid catalyst component was prepolymerised with VCH as described in Example 7.

Further, the polymer form the second gas phase reactor was passed to a third gas phase reactor where additional elastomeric copolymer was produced. The polymerisation conditions and the polymer properties are shown in Table 3.

TABLE 3

Production parameters of the high flow HECOs.

| | Example | unit | E7 | CE3 | CE4 |
|---|---|---|---|---|---|
| Cat | Catalyst | | E1 | E1 | CE1 |
| loop | B2 H2/C3 ratio | mol/kmol | 20 | 36 | 32 |
| | B2 Split | % | 51 | 43 | 50 |
| | B2 MFR$_2$ | g/10 min | 520 | 350 | 430 |
| | B2 XS | % | ND | 2.1 | 2 |
| GPR1 | B3 H2/C3 ratio | mol/kmol | 94 | 250 | ND |
| | B3 split | % | 49 | 57 | 50 |
| | B3 MFR2 | g/10 min | 400 | 370 | 350 |
| | B3 MFR in reactor | g/10 min | 300 | 380 | 280 |
| | B3 XS | % | 2.7 | 2 | 2 |
| GPR2 | B4 C2/C3 ratio | mol/kmol | 300 | 310 | 210 |
| | B4 H2/C2 ratio | mol/kmol | 105 | 100 | 410 |
| | B4 split | % | 13 | 23 | 12 |
| | B4 MFR$_2$ | g/10 min | 160 | 95 | 120 |
| | B4 XS | % | 16 | 25 | 14 |
| | B4 Ethene content | wt % | 9.1 | 7.6 | 23 |
| GPR3 | B4 C2/C3 ratio | mol/kmol | N/A | N/A | 725 |
| | B4 H2/C2 ratio | mol/kmol | N/A | N/A | 130 |
| | B4 split | % | N/A | N/A | 8 |
| | B4 MFR$_2$ | g/10 min | N/A | N/A | 100 |
| | B4 XS | % | N/A | N/A | 22 |
| | B4 Ethene content | ¤ wt % | N/A | N/A | 9.5 |
| Final | PP Mixer XS | % | 17.4 | 21.7 | 22 |
| product | PP ethene of AM | % | ND | 38.9 | 35 |
| | PP viscosity of AM | dl/g | 1.93 | 2.5 | 2.5 |
| | PP Pellet MFR$_2$ | g/10 min | 172 | 88 | 100 |

N/A: Not applicable
ND: Not determined

TABLE 4

Polymer properties of the high flow HECOs

| Example | unit | E8 | CE3 | CE4 |
|---|---|---|---|---|
| MFR$_2$ | g/10 min | 172 | 88 | 100 |
| Tm | ° C. | 164 | 164 | 165 |
| Hm | J/g | 88 | 89 | 86 |
| Tg(EPR) | ° C. | −46 | −52 | −51 |
| Tg(PP) | % | −0.5 | −1.4 | −2.2 |
| Flexural Modulus | MPa | 1350 | 1590 | 1390 |

The invention claimed is:
1. A process for polymerising propylene in the presence of a polymerisation catalyst comprising a solid catalyst component, an organoaluminium compound and an external electron donor, the process comprising the steps of (i) contacting propylene and hydrogen with the polymerisation catalyst in polymerisation conditions in a polymerisation reactor to produce a polymer of propylene; (ii) recovering the polymer of propylene from the polymerisation reactor; wherein the polymer of propylene has MFR$_2$ of from more than 100 to 10000 g/10 min; and the solid catalyst component comprises titanium, magnesium, halogen and an internal electron donor, characterised in that the internal electron donor is a compound according to formula (I):

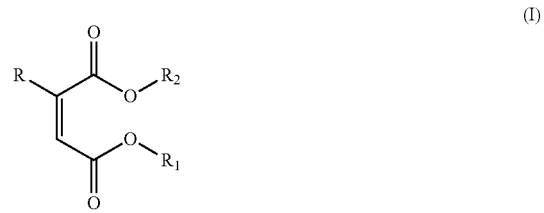

with $R_1$ and $R_2$ being the same or different and being a linear or branched $C_1$-$C_{12}$-alkyl group, and with R being H or a linear, branched or cyclic $C_1$ to $C_{12}$-alkyl; and the external electron donor is a silane compound having the formula $Si(OR^{11})_n R^{10}_{4-n}$, wherein n is 2 or 3, each $R^{11}$ is independently a linear or branched $C_1$-$C_4$ alkyl; each $R^{10}$ is independently a linear or branched alkyl group having from 1 to 24 carbon atoms and optionally containing an atom of group 15 of periodic table of elements or comprises a cyclic group having from 6 to 12 carbon atoms, and the finally obtained catalyst particles have surface areas below 20 m$^2$/g.

2. The process according to claim 1 wherein $R_1$ and $R_2$ are a linear or branched $C_1$-$C_8$-alkyl group.

3. The process according to claim 1 wherein $R_1$ and $R_2$ are the same.

4. The process according to claim 1 wherein R is a linear or branched $C_1$ to $C_3$-alkyl.

5. The process according to claim 4 wherein R is methyl.

6. The process according to claim 1 wherein each $R^{10}$ is independently selected from the group consisting of methyl, ethyl, propyl, isopropyl, tert-butyl, cyclohexyl and phenyl.

7. The process according to claim 1 wherein each $R^{10}$ is independently selected from the group consisting of methyl, ethyl, iso-butyl or cyclohexyl.

8. The process according to claim 6 wherein n is 2.

9. The process according to claim 1 wherein the polymerisation is conducted as a slurry polymerisation in a loop reactor wherein solid polymer particles are suspended in a fluid phase in said loop reactor.

10. The process according to claim 9 wherein the ratio of hydrogen concentration to propylene concentration in the fluid phase in the loop reactor is from 3 to 40 mol/kmol and the polymer of propylene has MFR$_2$ of from 100 to 2000 g/10 min.

11. The process according to claim 9 comprising the additional steps of passing the polymer of propylene recovered from the polymerisation reactor into a subsequent polymerisation reactor together with additional propylene and at least one comonomer selected from the group consisting of ethylene, linear 1-alkenes having 4 to 10 carbon atoms and mixtures thereof, to produce a copolymer of propylene comprising a semicrystalline matrix and a predominantly non-crystalline copolymer of propylene with the at least one comonomer.

12. A process for polymerising propylene in the presence of a polymerisation catalyst comprising a solid catalyst component, an organoaluminium compound and an external electron donor, the process comprising the steps of (i) contacting propylene and hydrogen with the polymerisation catalyst in polymerisation conditions in a polymerisation reactor to produce a polymer of propylene; (ii) recovering the polymer of propylene from the polymerisation reactor; wherein the polymer of propylene has $MFR_2$ of from more than 100 to 10000 g/10 min; and the solid catalyst component comprises titanium, magnesium, halogen and an internal electron donor, characterised in that the internal electron donor is a compound according to formula (I):

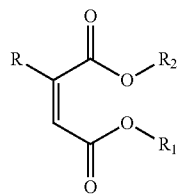

(I)

with $R^1$ and $R^2$ being the same or different and being a linear or branched C1-C12-alkyl group, and with R being H or a linear, branched or cyclic C1 to C12-alkyl; and the external electron donor is a silane compound having the formula $Si(OR^{11})_nR^{10}_{4-n}$, wherein n is 2 or 3, each $R^{11}$ is independently a linear or branched C1-C4 alkyl; and each $R^{10}$ is independently $NR^{12}R^{13}$ and $R^{12}$ and $R^{13}$ are independently selected from the group consisting of methyl, ethyl, n-propyl, n-butyl, octyl, decanyl, iso-propyl, iso-butyl, iso-pentyl, tert-butyl, tert-amyl, cyclohexyl, methylcyclopentyl and cycloheptyl, and the finally obtained catalyst particles have surface areas below 20 $m^2/g$.

13. The process according to claim 12 wherein $R^{12}$ and $R^{13}$ are ethyl.

14. The process according to claim 12 wherein n is 3.

15. The process according to claim 12 wherein $R^{11}$ is the same and is selected from the group consisting of methyl and ethyl.

* * * * *